UNITED STATES PATENT OFFICE.

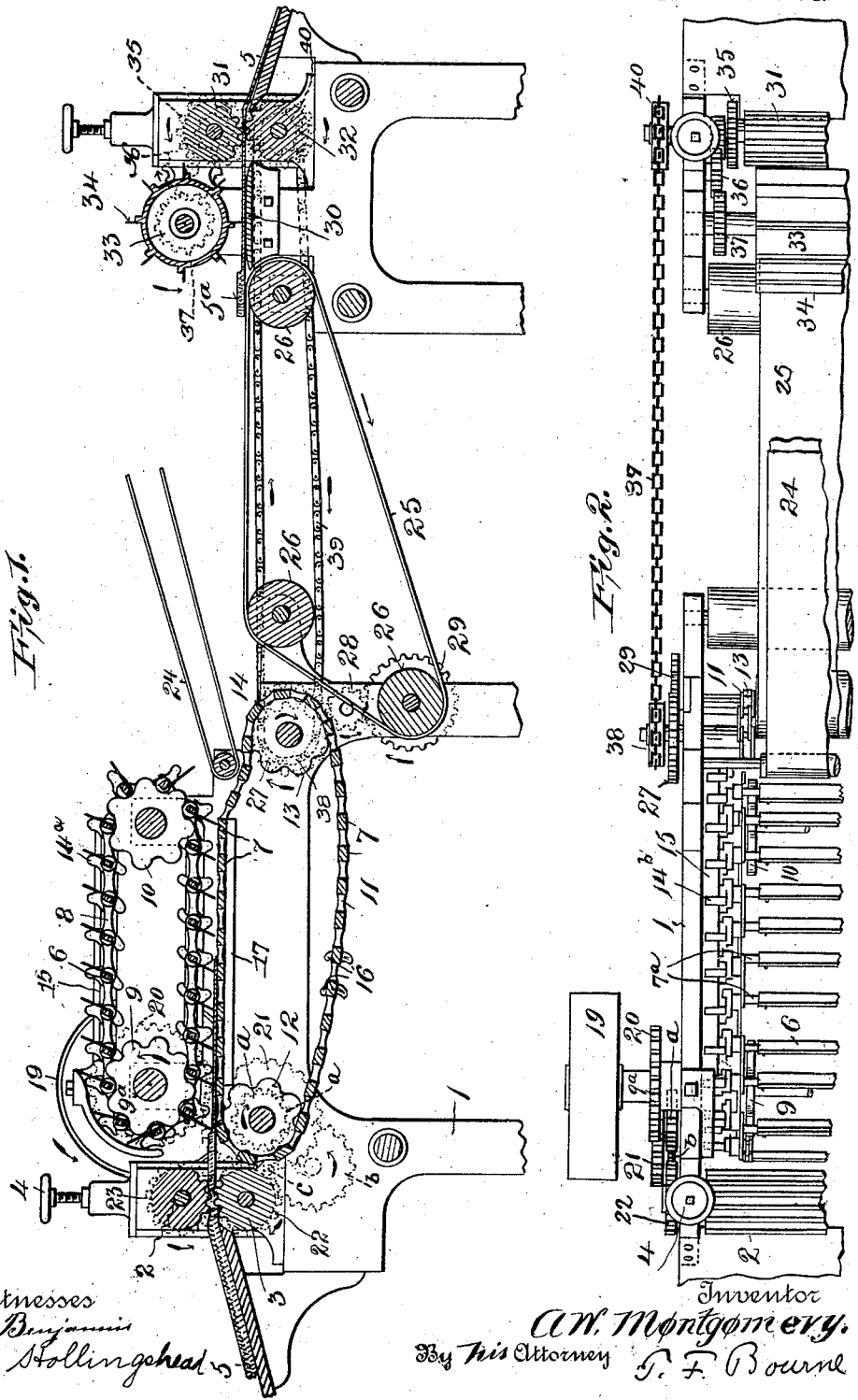

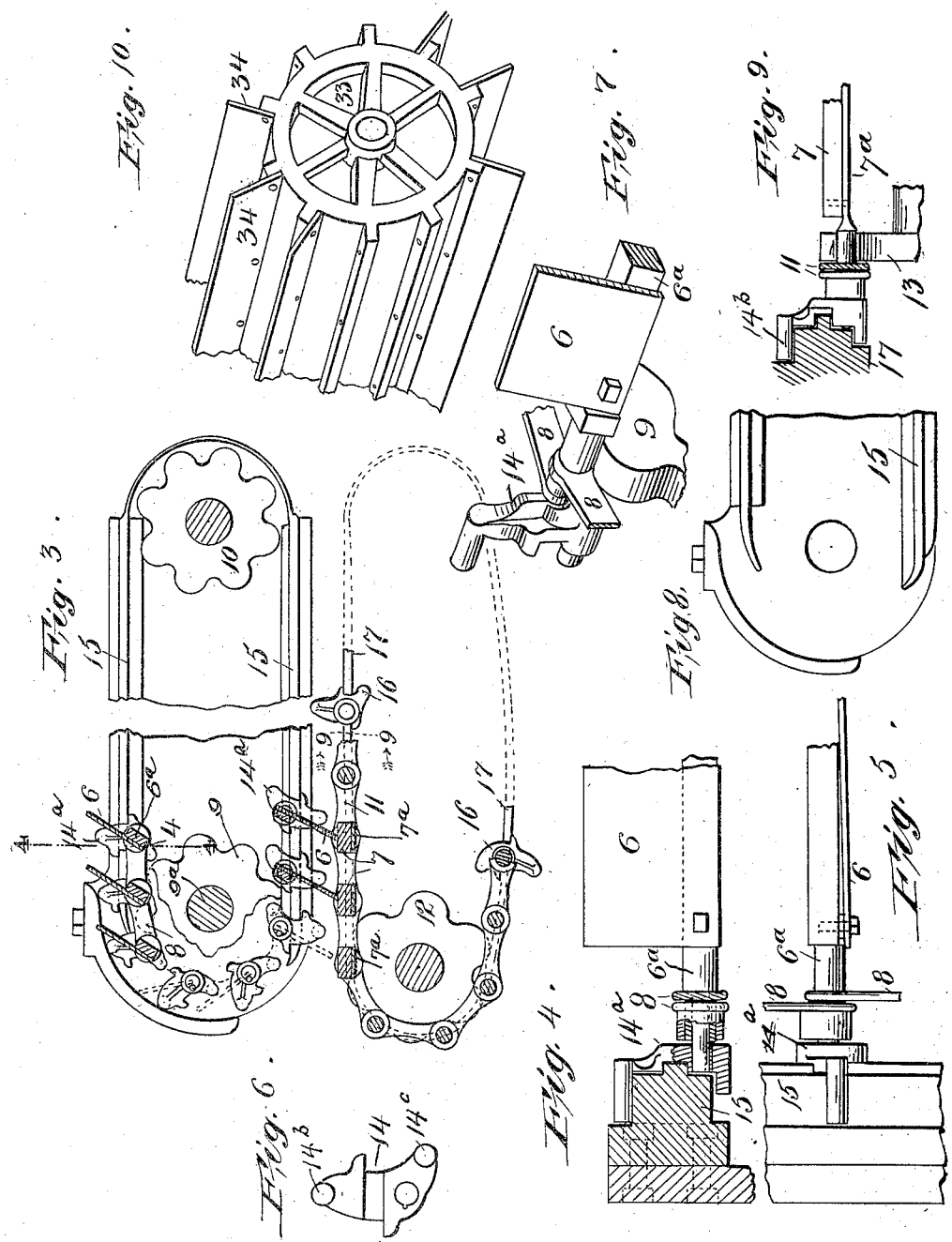

ALPHEUS W. MONTGOMERY, OF NEW YORK, N. Y.

FIBER-CLEANING MACHINE.

No. 859,504. Specification of Letters Patent. Patented July 9, 1907.

Application filed August 18, 1904. Serial No. 221,232

*To all whom it may concern:*

Be it known that I, ALPHEUS W. MONTGOMERY, a citizen of the United States, and a resident of New York city, borough of Queens, New York, have invented certain new and useful Improvements in Fiber-Cleaning Machines, of which the following is a specification.

The object of my invention is to provide a machine into which the bark or skin of the tree is to be fed and by which the pulpy or watery substance will be quickly scraped from the bark or fibers whereby economy in the production of Manila hemp fibers may be effected.

My invention comprises the novel details of improvement that will be more fully hereinafter set forth and then pointed out in the claims.

Reference is to be had to the accompanying drawings forming part hereof, wherein, Figure 1 is a longitudinal section through a machine embodying my invention, Fig. 2 is a plan view of part thereof, Fig. 3 is an enlarged detail sectional view through the scrapers, Fig. 4 is a cross section, enlarged, substantially on the line 4, 4, in Fig. 3, Fig. 5 is a plan view of Fig. 4, Fig. 6 is a detail view of one of the dogs used with the chains for the scraper, Fig. 7 is a detail perspective view of one of the scrapers and its dog, Fig. 8 is a detail view of the guide for the scrapers, Fig. 9 is a detail view partly in section on the line 9, 9, in Fig. 3, and Fig. 10 is an enlarged perspective view of the finishing roller shown at the right hand side of Fig. 1.
Similar numerals of reference indicate corresponding parts in the several views.

In the drawings the numeral 1 indicates a suitable frame in which are journaled feeding rollers 2, 3, the roller 2 preferably being permitted vertical adjustment by means of screws 4 in usual manner. Said rollers are shown corrugated for the purpose of engaging and feeding forward the bark 5 to be treated. In line with the rollers 2, 3, are movable blades 6 adapted to engage the pulp or pulpy substance upon the inner side of the bark to scrape the same from the bark, which blades are respectively opposed to movable slats or bars 7. The blades 6 are carried by endless chains or the like 8, which pass over sprockets 9, 10, suitably journaled upon frame 1, and the bars or slats 7 are correspondingly carried by endless chains 11 passing over sprockets 12, 13 journaled in frame 1. In the enlarged view in Fig. 3 part of the chains 8 and 11 are broken away for the purpose of clearer illustration. The relative arrangement of the blades 6 and bars or slats 7 is such that a blade will aline with and substantially bear on a bar or slat so that they will travel at equal speeds thereby gripping the bark between them, as shown in Figs. 1 and 3. The relative rate of travel of the blades 6 and bars or slats 7 with respect to the surface speed of the rollers 2, 3, is such that the blades and bars will travel faster than the bark is fed by the rollers 2, 3, so as to scrape the pulpy substance from the surface of the bark while the bark continues to travel forwardly in the direction of movement of the blades and slats. While any suitable means may be provided for causing the blades 6 and bars or slats 7 to properly move so that a blade will always aline with a bar or slat I have shown the blades 6 provided with dogs 14 adapted to engage and ride along a guide 15, carried by frame 1, which preferably cause the blades at the lower part of the chain 8 to slant downwardly (see Fig. 3). The blades 6 are shown secured to shafts or bars 6ª to which the links 8 of the chain are swiveled, and to which bars 6ª the dogs 14 are secured (see Figs. 4 and 5).

In Fig. 5 I have shown the blade 6 as located at an angle to the planes of the adjacent bars 7, so that as the blades slide along the bark or fiber they will have a shearing action thereon. The arrangement and operation of the dogs 14 and guide 15 may be similar to those used in the well known rope making machines, such as breakers, spreaders, and the like for operation with endless chains. As shown, the dogs have recesses 14ª in their outer faces receiving the guide 15, and long and short pins 14ᵇ, 14ᶜ on opposite sides of the guide, and at the forward part the guide 15 is discontinued and opposed to the space thus formed is a curved guide 15ª against the inner surface of which the pins 14ᵇ slide to keep the blades 6 extended upwardly until said pins pass from the lower end of guide 15ª, whereupon the dogs and blades by gravity will swing down and the recesses in the dogs will engage guide 15 to hold the blades in relation to bars 7. The bars or slats 7 are provided with dogs and a guide similar to those above described, and the bars or slats 7 may be secured upon or made integral with cross bars 7ª swiveled in the links 11 and provided with dogs 16 engaging a guide 17, (see Fig. 9) serving to assure a horizontal position of the upper surfaces of the slats beneath the blades 6. Only part of the dogs and guides 16 and 17 are shown in Figs. 1 and 3 for the sake of clearness.

The sprockets 9 and 12 are geared together so that they will travel at the same surface speed to assure that the blades 6 and the bars or slats 7 have the same rate of travel, and in the arrangement shown the rollers 2, 3 are driven at a slower speed than the speed of the blades and slats. For these purposes I have shown a driving pulley 19 connected with shaft 9ª of sprocket 9, and having a gear 20 that meshes with a gear 21 connected with the shaft of sprocket 12, which by means of reducing gears and pinions, *a*, *b*, *c* operate the gears 22, 23 connected respectively with the rollers 2 and 3. Of course, if preferred, power could be applied to any other shaft and transmitted in suitable manner to the chains and rollers.

When the pulley 19 is driven in the direction of the arrow in Fig. 1 and a strip of bark to be treated is fed between the rollers 2, 3, the strip will pass between the knives 6 and bars or slats 7, and as they travel forwardly faster than the strip is fed by the rollers 2, 3 the result will be that the blades will scrape from the bark or fiber the pulpy substance thereon. This pulpy substance may be removed from the machine by any suitable means, as by allowing it to pass up an endless apron 24 supported and operated in well known manner, the fiber owing to its wet and flexible condition, dropping down and following the bars 7 under the adjacent end of apron 24, while the pulpy material that would accumulate upon the fiber is carried off by apron 24.

As there is some space between the rollers 2, 3 and the working blade 6 nearest thereto there will be some pulpy matter left upon the rear or unscraped end of the bark or fiber at the part then between said rollers and blades after the bark leaves the rollers 2, 3, and while such pulpy matter may be removed from the strip or bark by hand in usual manner, I provide means for removing it therefrom as the strip is passed through the machine. To this end I have shown an endless apron 25 passing over rolls 26 journaled in the main frame, which rolls and apron may be operated by gearing 27, 28, 29, driven from the shaft of sprocket 13. In line with the upper run of apron 25 is a table or plate 30, and at 31, 32 are rollers arranged similarly to rollers 2, 3, but driven at a greater surface speed than the speed of blades 6, so as to assure that the fiber that has been acted upon by the blades 6 will be quickly delivered from the machine. Above the table 30 is a drum 33 having blades 34 to act on the pulpy substance 5ª at the rear end of the bark or fiber 5. The drum 33 is shown connected with the roller 31 by gearing 35, 36, 37, whereby the drum 33 will be driven in the same direction as roller 31, but at a surface speed slower than the rollers 31, 32. I have shown the shaft of sprocket 13 as provided with a sprocket 38, over which a chain 39 passes to a sprocket 40 on the shaft of roller 32 (see Fig. 2), whereby the rollers 31 and 32 and the drum 33 may be conveniently rotated. With this arrangement, when the bark that has been acted upon by the blades 6 has passed between the rollers 31, 32 the latter, operating at a speed greater than the speed of the drum 33, will quickly pull the bark beneath said drum, but the blades 34 of the latter will act upon the pulpy matter on the bark to strip it therefrom thereby finishing the cleaning of the rear end of the strip of bark because as the rollers 31, 32 pull the bark faster than the travel of blades 34 the latter will scrape the pulpy material from the bark.

By means of my improvements it will be apparent that by simply feeding the bark between the rollers 2, 3, the pulpy material upon the bark will be quickly scraped therefrom and without injury to the bark, whereby the operation of cleaning the bark is much quicker and more cheaply performed than by the usual hand method.

Having now described my invention what I claim is:—

1. A machine of the character described comprising a movable blade adapted to scrape pulpy material from bark, means for feeding bark to the blade, means for causing the blade to travel faster along the bark than the latter is fed under the blade, a rotary drum having blades to engage material on the bark, and means for drawing the bark beneath said blades at a speed greater than the speed of rotation of said blades, substantially as described.

2. A machine of the character described comprising a movable blade adapted to scrape material from bark, means for feeding bark to the blade, means for causing the blade to travel faster along the bark than the latter is fed under the blade, a rotary drum provided with blades to engage the material on the bark not scraped off by the first named blade, rollers to draw the bark beneath the rotary blades, and means for operating said rollers at a surface speed greater than the surface speed of rotation of said rotary drum, substantially as described.

A. W. MONTGOMERY.

Witnesses:
T. F. BOURNE,
M. HOLLINGSHEAD.